April 8, 1952 E. H. GUBOFF 2,592,026

CLUTCH MEANS FOR PHONOGRAPH RECORDS

Filed April 24, 1948

Inventor

EDWARD H. GUBOFF

By C. G. Stratton

Attorney

Patented Apr. 8, 1952 2,592,026

UNITED STATES PATENT OFFICE 2,592,026

CLUTCH MEANS FOR PHONOGRAPH RECORDS

Edward H. Guboff, Beverly Hills, Calif.

Application April 24, 1948, Serial No. 23,017

4 Claims. (Cl. 274—42)

This invention relates to improvements in labels for phonograph records and contemplates an improved label, while of simple form, embodies a plurality of features.

An object of the invention is to provide a record label that serves to protect against wear any label there may already be on said record and also serves to reinforce the spindle hole of the record.

Another object of the invention is to provide a record label that embodies means giving a stroboscopic effect, whereby the speed of rotation of said record, when being played, may be checked with regard to its proper speed.

Another object of the invention is to provide a record label in which the stroboscopic means is formed to comprise clutch or non-slippage gripging means that coacts with a similar label on a superimposed record to insure that the topmost record of a stack—the one being played—is not retarded in rotational speed as may be caused by the drag of the reproducing needle. Records, frequently, are not quite flat and may have only two points of contact with a contiguous record. The topmost record of a stack of records, being unweighted, may have a tendency to creep, while being played, since the drag of the needle may overcome the friction between said topmost record and the one with which it has the two point contact. This invention, therefore, contemplates forming the stroboscopic means provided on the labels to interengage where one drives the other without slippage.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Figure 1:
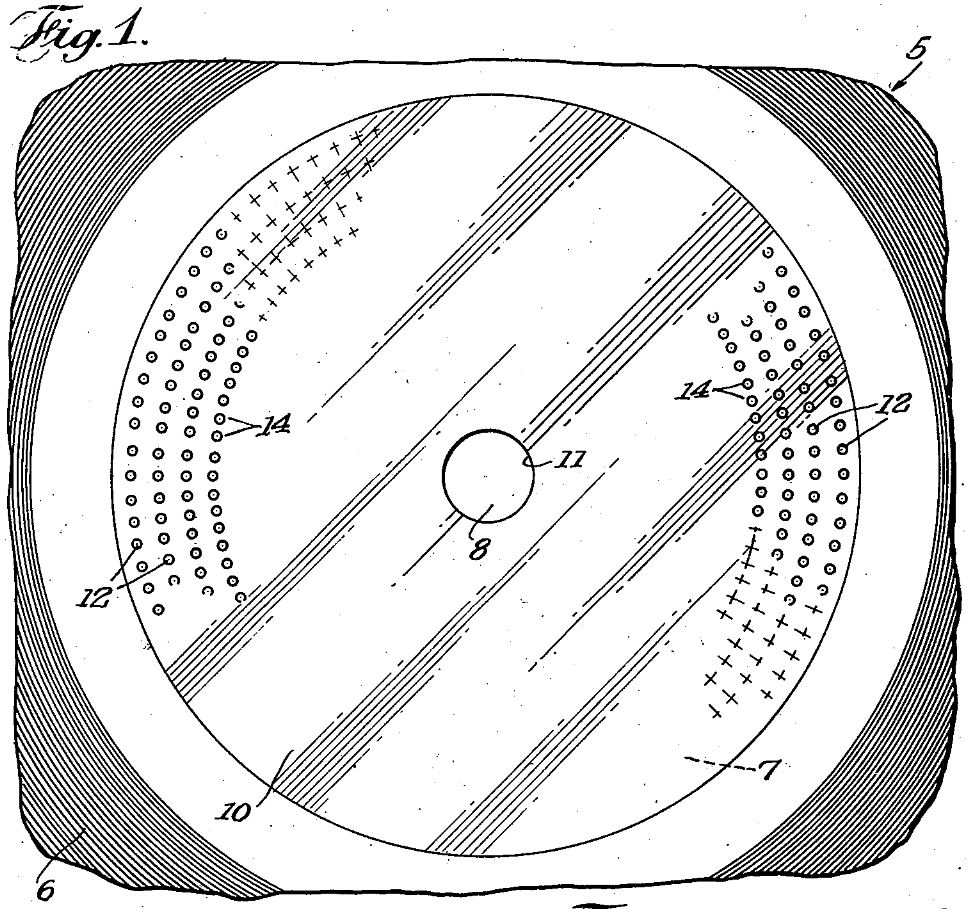
Fig. 1 is an enlarged plan view of the middle of a conventional phonograph disc record to which the label of the present invention is applied.
Figure 2:
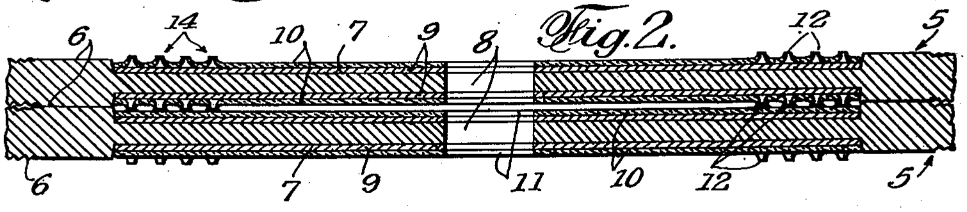
Fig. 2 is a cross-sectional view thereof showing said record and a second record in the relationship they would have when arranged in a stack.
Figure 3:
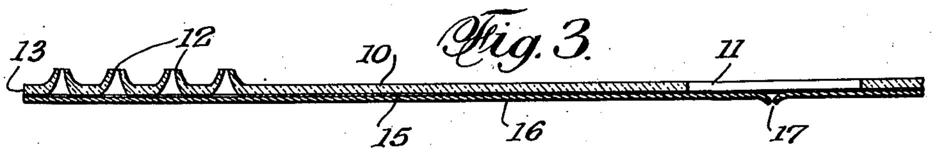
Fig. 3 is a further enlarged partial sectional view of the label before the same is applied to a record.

The conventional record 5 that is illustrated has opposite grooved playing surface areas 6, and a central circular depressed area 7 that surround a hole 8 through which the spindle of a turntable, supporting a stack of such records, extends.

The type of record changer with which the present invention is particularly adapted to be used is the conventional one having a spindle with a slight intermediate offset, forming a shelf, the records to be played being retained by said shelf upon the upper part of said spindle, and being released one at a time by means which pushes the lowermost record laterally off of the shelf, letting it fall upon the turntable.

The conventional record is provided in the area 7 on each side with a printed label 9 that bears the usual information relating to the recording on that side, the label being applied to the record at the place of manufacture. The label 10 of the present invention is adapted to be applied over each label 9, in which case it will generally be of transparent material such as cellulose sheet to preserve the visibility of the underlying label, and it will generally be applied to records now in being, to transform them into embodiments of the subject invention. However, the label 9 may be omitted and the label 10 used in its stead, in which case it may be part of the record as manufactured.

The principal purpose of the invention is to provide a disk record having clutch faces on its opposite sides, adapted to interengage with similarly provided records in a stack on the turntable, to ensure the full transmission of the rotative speed of the turntable to the topmost record which is the one most likely to slip under the drag of the needle, since it is not weighted by overlying records.

The clutch means must also have the capacity to permit the lateral movement of the lowermost or heaviest loaded record of the unplayed stack, responsive to the edgewise push of the record changer.

In the embodiment of the invention described, each label 10 is provided with a plurality of circumferentially arranged series of teats or projections 12, preferably located in an outlying zone from the center hole and between said center hole and the zone containing the sound convolutions.

Said projections may be variously formed. In this instance, they are formed as outwardly pressed perforations resulting in conical protuberances of such height that they extend beyond the playing surfaces 6 of a record.

It is important that the pattern of projections shall be the same for all records that are to be correlated in the stack and that the projections of a series shall be far enough apart in a circumferential direction to permit the interdigitation of the projections of the corresponding confronting series on a contiguous record.

Since the projections 12 of each disc 10 protrude beyond the surfaces 6, it will be evident that contiguous records are, in effect, clutched together and will rotate in unison. Thus, if all the records of a stack, of which the topmost record is being played, are so clutched to each other, any tendency for said topmost record to slip under drag of the playing needle is fully overcome and the record will maintain its proper speed.

In order to permit lateral shift of the clutch means it is essential that the projections be substantially circular in cross-section, spaced apart both circumferentially and in a radial direction, (in the event that there is a plurality of circumferential series), far enough to allow the passage of a projection between them, and they must be outwardly tapered so that if in the relative lateral movement between adjacent records two projections come together with their common axial plane so closely parallel to the direction of lateral movement as to refuse to pass one another laterally, one will ride over the other under the pushing force of the record changer. The spindle at the point intersected by the plane of movement of the record changer is shaped to give the record some freedom of lateral play so that normally when the round sides of two projections meet, one moves around the other, permitting the lateral release movement of the record.

The fact that the label may or may not carry informative printed matter is not material to the invention. The important feature is the provision of clutch faces which grip upon circumferential movement and release upon relative lateral movement of contiguous records. The label is a convenient medium for integrating the clutch projections with the record, and may be regarded as an attachable center and therefore part of the record when attached thereto.

According to the present invention, each label 10, in the case where the invention is to be completed by the ultimate purchaser of the record, is provided on the surface opposite to the projections 12 with an adhesive coating 15, by means of which the label is fixed in place. Said coating may be protected, until the label is applied, by removable sheets 16 that may be slit along a line 17, affording ready peeling of the sheets from label 10.

By providing a suitable number of radially and uniformly arranged groups of projections 14, the rotational speed of the records and, therefore, of the turntable that supports them, can be checked with respect to normal speed.

The groupings 14, thus, comprise a stroboscope that, when used in a flickering light that is illuminated by a source of alternating current, reveals whether the turntable is turning at its proper speed, or faster or slower.

In practice, where the stroboscope is to be viewed under a 60 cycle light, ninety two groupings of projections 14 are provided on the label. When a 25 or 50 cycle light is used, seventy seven such groupings are provided. In each instance, the rate of light flicker is so related to the time that one grouping 14 displaces the next adjacent grouping, that, for a turntable that rotates at seventy eight revolutions per minute, the groupings will appear to be stationary. The number of groupings 14 vary according to the relationship of light flicker speed and turntable speed.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. Disk phonograph record having a central hole and, on each side, an annular playing face, and a depressed area between said hole and playing face, clutch means comprising a series of projections extending from the surface of each depressed area, outwardly beyond the plane of each respective playing face, the projections being round in cross-section, tapered outwardly, and spaced apart, in the planes of said respective areas, a sufficient distance to permit free lateral passage between them of the projections of a contiguous record having a similar clutch face, the spaces between the projections being in the same plane as the adjacent depressed area.

2. Disk phonograph record having a central hole and on each side an annular playing face, clutch means located in a zone intermediate said hole and each respective playing face, comprising a circumferential series of projections from the surface of said record in said intermediate zone extending outwardly beyond the respective playing faces, the projections being round in cross-section, tapered outwardly, and spaced apart at their bases a sufficient distance to permit free lateral passage between them of the projections of a contiguous record having a similar clutch means, the spaces between the projections being in the same plane as the adjacent depressed area.

3. Disk phonograph record having a central hole, and, on each side, an annular playing face and a depressed area between said hole and playing face, attachable clutch faces adhesively secured to said record in said depressed areas, each clutch face comprising a circular sheet having a central hole and a circumferential series of spaced projections extending outwardly from one face thereof, said projections being round in cross-section, tapered outwardly, and spaced apart in the plane of said sheet a sufficient distance to permit free lateral passage between them of the projections of a similar contiguous clutch face, the spaces between the projections being in the same plane as the adjacent depressed area, said projections extending outwardly beyond the planes of the respective playing faces.

4. Disk phonograph record having a central hole and, on each side, an annular playing face, clutch means located in a zone intermediate said hole and each respective playing face, comprising a circular sheet having a central hole and a circumferential pattern of spaced projections extending outwardly from one face thereof, said projections being round in cross-section, tapered outwardly, and spaced apart from one another in all directions a sufficient distance to permit free lateral passage between them of the projections of a similar contiguous clutch means, the spaces between the projections being in the same plane as the adjacent depressed area.

EDWARD H. GUBOFF.

REFERENCES CITED

The following references are of record in the file of this patent:

UNITED STATES PATENTS

| Number | Name | Date |
|---|---|---|
| 741,247 | Johnson | Oct. 13, 1903 |
| 1,288,610 | Jones | Dec. 24, 1918 |
| 1,804,453 | Basseches | May 12, 1931 |
| 2,544,010 | Di Giannantonio | Mar. 6, 1951 |

FOREIGN PATENTS

| Number | Country | Date |
|---|---|---|
| 8,122 | Great Britain | Aug. 26, 1909 |
| 124,508 | Austria | Sept. 25, 1931 |
| 381,164 | Great Britain | Sept. 26, 1932 |
| 63,231 | Denmark | Mar. 5, 1945 |